United States Patent
Muir et al.

(10) Patent No.: US 11,674,504 B2
(45) Date of Patent: Jun. 13, 2023

(54) GEOTHERMAL LOOP ENERGY PRODUCTION SYSTEMS

(71) Applicant: GreenFire Energy Inc., Emeryville, CA (US)

(72) Inventors: Mark P. Muir, Emeryville, CA (US); Alan D. Eastman, Emeryville, CA (US)

(73) Assignee: GreenFire Energy Inc., Emeryville, CA (US)

( * ) Notice: Subject to any disclaimer, the term of this patent is extended or adjusted under 35 U.S.C. 154(b) by 0 days.

(21) Appl. No.: 16/900,248

(22) Filed: Jun. 12, 2020

(65) Prior Publication Data

US 2020/0309101 A1 Oct. 1, 2020

Related U.S. Application Data

(62) Division of application No. 15/318,606, filed as application No. PCT/US2015/035573 on Jun. 12, 2015, now abandoned.

(Continued)

(51) Int. Cl.
*F03G 7/04* (2006.01)
*E21B 47/07* (2012.01)
(Continued)

(52) U.S. Cl.
CPC ............... *F03G 7/04* (2013.01); *E21B 47/06* (2013.01); *E21B 47/07* (2020.05); *E21B 47/09* (2013.01);
(Continued)

(58) Field of Classification Search
CPC . F03G 7/04; E21B 49/003; E21B 7/04; E21B 47/09; E21B 47/065; E21B 47/06;
(Continued)

(56) References Cited

U.S. PATENT DOCUMENTS

2006/0096105 A1* 5/2006 Haugland ............. E21B 47/022
33/304
2007/0223999 A1* 9/2007 Curlett .................... E21B 43/17
405/55

(Continued)

FOREIGN PATENT DOCUMENTS

EP          0036592 A1 * 9/1981 .............. F03G 7/04

*Primary Examiner* — George S Gray
(74) *Attorney, Agent, or Firm* — Osha Bergman Watanabe & Burton LLP

(57) ABSTRACT

A system for producing geothermal energy may include a tiered geothermal loop energy production system. The tiered geothermal loop energy production system includes: a first closed-loop pipe system emplaced within a heat-producing geologic formation, the first closed-loop pipe system having a first energy production; and a second closed-loop pipe system emplaced within a heat producing geologic formation, the second closed-loop pipe system having a second energy production greater than the first energy production; and, optionally a third closed-loop pipe system emplaced within a heat producing geologic formation, the third closed-loop pipe system having a third energy production. An energy conversion system is configured to convert energy from the tiered geothermal loop energy production system to another form of energy.

13 Claims, 4 Drawing Sheets

Related U.S. Application Data

(60) Provisional application No. 61/997,904, filed on Jun. 13, 2014.

(51) Int. Cl.
*F24T 10/10* (2018.01)
*E21B 47/06* (2012.01)
*E21B 47/09* (2012.01)
*E21B 49/00* (2006.01)
*E21B 7/04* (2006.01)

(52) U.S. Cl.
CPC ............ *E21B 49/003* (2013.01); *F24T 10/10* (2018.05); *E21B 7/04* (2013.01); *F24T 2201/00* (2018.05); *Y02E 10/10* (2013.01)

(58) Field of Classification Search
CPC ............ E21B 43/164; Y02E 10/10–40; Y02E 10/125; Y02E 50/11; F24T 10/10–30; F24T 50/00; F24T 2010/50–56; F24T 50/00; F24T 2201/00; Y10T 29/49002
See application file for complete search history.

(56) References Cited

U.S. PATENT DOCUMENTS

| | | | |
|---|---|---|---|
| 2007/0245729 A1* | 10/2007 | Mickleson | F01K 23/02 60/641.2 |
| 2010/0307756 A1* | 12/2010 | Jung | E21B 43/17 166/308.1 |
| 2011/0048005 A1* | 3/2011 | McHargue | F24T 10/10 165/45 |
| 2011/0100002 A1* | 5/2011 | Muir | F24T 10/20 60/641.2 |
| 2011/0232858 A1* | 9/2011 | Hara | F24T 10/17 165/45 |
| 2012/0174581 A1* | 7/2012 | Vaughan | F24T 10/10 290/400 |
| 2015/0122453 A1* | 5/2015 | Colwell | F24T 10/30 165/45 |
| 2015/0300327 A1* | 10/2015 | Sweatman | E21B 43/25 60/641.2 |
| 2016/0265314 A1* | 9/2016 | Saurer | E21B 23/12 |

\* cited by examiner

GEOTHERMAL LOOP ENERGY PRODUCTION SYSTEMS

BACKGROUND

Energy production from heating subsurface water in geothermally-heated rock formations is responsible for a large amount of electrical power in the US. In 2014, estimates of US geothermal electrical capacity were around 3442 MW, with another 1000 MW in some stage of development. Power production in many of these projects involves moving large quantities of water through the formation to the surface, followed by reinjection. One consequence of that way of generating power is that usually only one power production facility is possible at a given site, because so much of the site's hot water is cooled to produce the steam required.

Closed-loop geothermal systems using supercritical carbon dioxide, rather than water, as the heat transfer fluid are currently under development. A schematic diagram of such a process is illustrated in FIG. 1. In general, supercritical $CO_2$ (sCO2) is passed down an injection well 10, energized within a subsurface zone 12 containing sufficient heat, and the energized $CO_2$, which may have an increased temperature and an increased pressure, is recovered via a production well 14. The energized $CO_2$ is then converted to energy, such as electricity, via a sCO2 turbine 16 and a generator 18. The system may also include pressure regulation and injection control equipment, generally designated at 19.

Geothermal systems, such as that illustrated in FIG. 1, are generally disposed within a geothermal reservoir via a wellbore drilled with a generic goal of hitting somewhere within the "hot zone" of the reservoir. As a result, current geothermal energy production systems, in general, do not effectively utilize the available energy from a given geothermal area.

SUMMARY OF THE CLAIMED EMBODIMENTS

Embodiments disclosed herein relate to methods and systems to more effectively utilize SCO2 geothermal systems to produce energy. More specifically, embodiments disclosed herein relate to methods and systems to more effectively utilize the geothermal heat available in a given formation.

In one aspect, embodiments disclosed herein relate to a method of efficiently harvesting geothermal energy. The method may include drilling a first wellbore into a subsurface geologic formation. While drilling the first wellbore, data may be collected from the subsurface geologic formation. The collected data may then be analyzed to identify a target zone. Once identified, a second wellbore is drilled to the identified target zone, and a closed-loop pipe system may be emplaced within the second wellbore to harvest energy from the target zone.

In another aspect, embodiments disclosed herein relate to a system for producing geothermal energy. The system may include a first closed-loop pipe system emplaced within a convection zone of a heat-producing geologic formation. The system may also include a second closed-loop pipe system emplaced within a fault within the convection zone or within a fault within a caprock zone proximate the convection zone of the heat producing geologic formation.

In another aspect, embodiments disclosed herein relate to a method of producing geothermal energy. The method may include drilling a wellbore into a subsurface geologic formation with a drill bit. While drilling the wellbore, properties of the subsurface geologic formation are measured. The measured properties of the subsurface geologic formation are analyzed to identify a target zone, and a trajectory of the drill bit is adjusted to pass the wellbore into or through the identified target zone. A closed-loop pipe system may then be emplaced within the wellbore to harvest energy from the target zone.

In another aspect, embodiments disclosed herein relate to a method of producing geothermal energy. The method may include analyzing measurement while drilling (MWD) data or logging while drilling (LWD) data of a geologic formation to identify a convective geothermal target zone. A wellbore may then be drilled to the identified convective geothermal target zone, and a closed-loop pipe system may be emplaced within the wellbore to harvest energy from the convective geothermal target zone.

In another aspect, embodiments disclosed herein relate to a method of producing geothermal energy. The method may include disposing two or more closed-loop pipe systems within a geologic formation at targeted locations having different convective heat flow characteristics. Energy from the geologic formation may then be harvested via the two or more closed-loop pipe systems and converted via a conversion system configured to utilize the two or more closed-loop pipe systems in tiered manner.

In another aspect, embodiments disclosed herein relate to a method of producing geothermal energy. The method may include analyzing formation data to determine two or more target locations having different convective heat flow characteristics. A first wellbore may be drilled to a first target location, and a first closed-loop pipe system may be disposed within the first wellbore to harvest energy from the formation. A second wellbore may be drilled to a second target location, and a second closed-loop pipe system may be disposed within the second wellbore to harvest energy from the formation.

Other aspects and advantages will be apparent from the following description and the appended claims.

DETAILED DESCRIPTION

Figure 1:
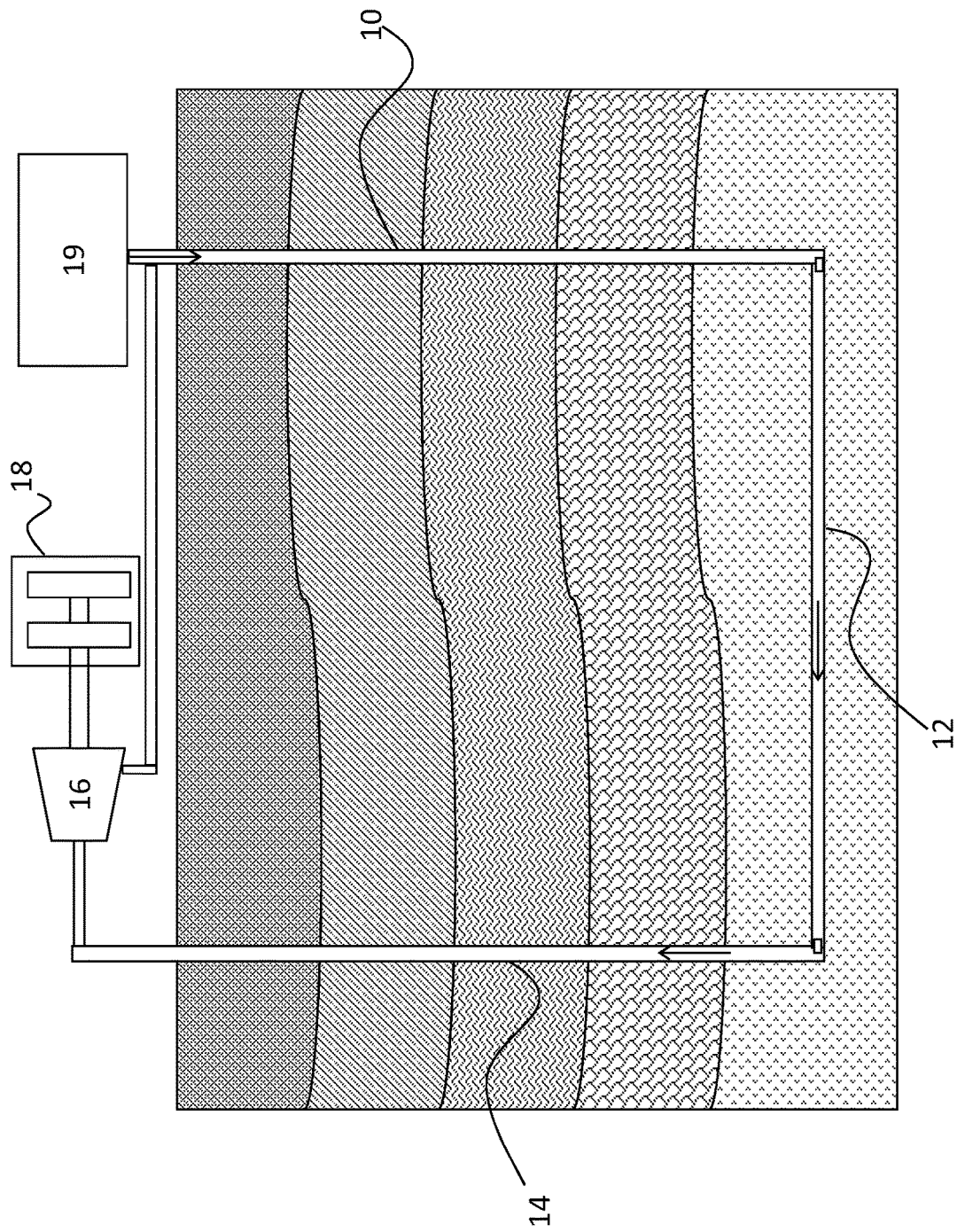
FIG. 1 is a simplified flow diagram of a generic geothermal loop energy production system.

As noted above, geothermal systems, such as that illustrated in FIG. 1, are generally disposed within a geothermal reservoir via a wellbore drilled with a generic goal of hitting somewhere within the "hot zone" of the reservoir. In some instances, after drilling of the wellbore, the formation is stimulated to improve convection. Hitting the hot zone and stimulating the area around the wellbore is generally sufficient for providing some heat to a geothermal loop energy production system. It is noted, however, that the efficiency of formation heat utilization is generally low, even with stimulation.

Embodiments disclosed herein relate to methods and systems to more effectively utilize sCO2 geothermal systems to produce energy. More specifically, embodiments disclosed herein relate to methods and systems to more effectively utilize the geothermal energy available in a given formation. Further, embodiments disclosed herein may provide for enhanced energy recovery with a reduced need for or without the use of stimulation processes to enhance convection proximate the wellbore.

The general view of subterranean formations has been that they are one large cell. However, this is a gross oversimplification, likely resulting in the low energy utilization in current geothermal projects. In contrast to this general view, the geothermal formation area may include discrete zones of high convection, and discrete zones of low convection, depending upon the very localized porosity of the rocks within the formation. A particular volume of rock having sufficient geothermal heat may include zones of rock having higher and lower primary and secondary porosities, higher and lower local temperatures, higher and lower amounts of water circulating by convection or advection, as well as other varying properties.

Rather than aiming at a large area that may include some water flow, embodiments disclosed herein target placement of a closed-loop pipe system within the portions of a geothermal field that already contain natural convection. The targeted placement may thus provide for full development of a field, placing pipe systems where they may effectively withdraw the most energy. Further, the targeted placement into natural convection zones may allow for reduced or elimination of stimulation (i.e., permeability enhancement) operations associated with the energy production systems. This is an added benefit considering that the public seems to consider all stimulation to be fracking and that the perception of fracking causes considerable public opposition. While stimulation may be used to locally enhance convection or flow, stimulation of an indiscriminately placed wellbore may only result in localized enhancements and may provide for only a fraction of the circulation naturally present in other areas of a field. Embodiments disclosed herein target placement of one or multiple wellbores, advantageously placing the wellbores proximate convective areas of a geothermal field. The resulting tiered or stacked geothermal loop energy production systems, including pipe systems emplaced according to embodiments herein, may thus effectively withdraw energy from the field.

Figure 2:
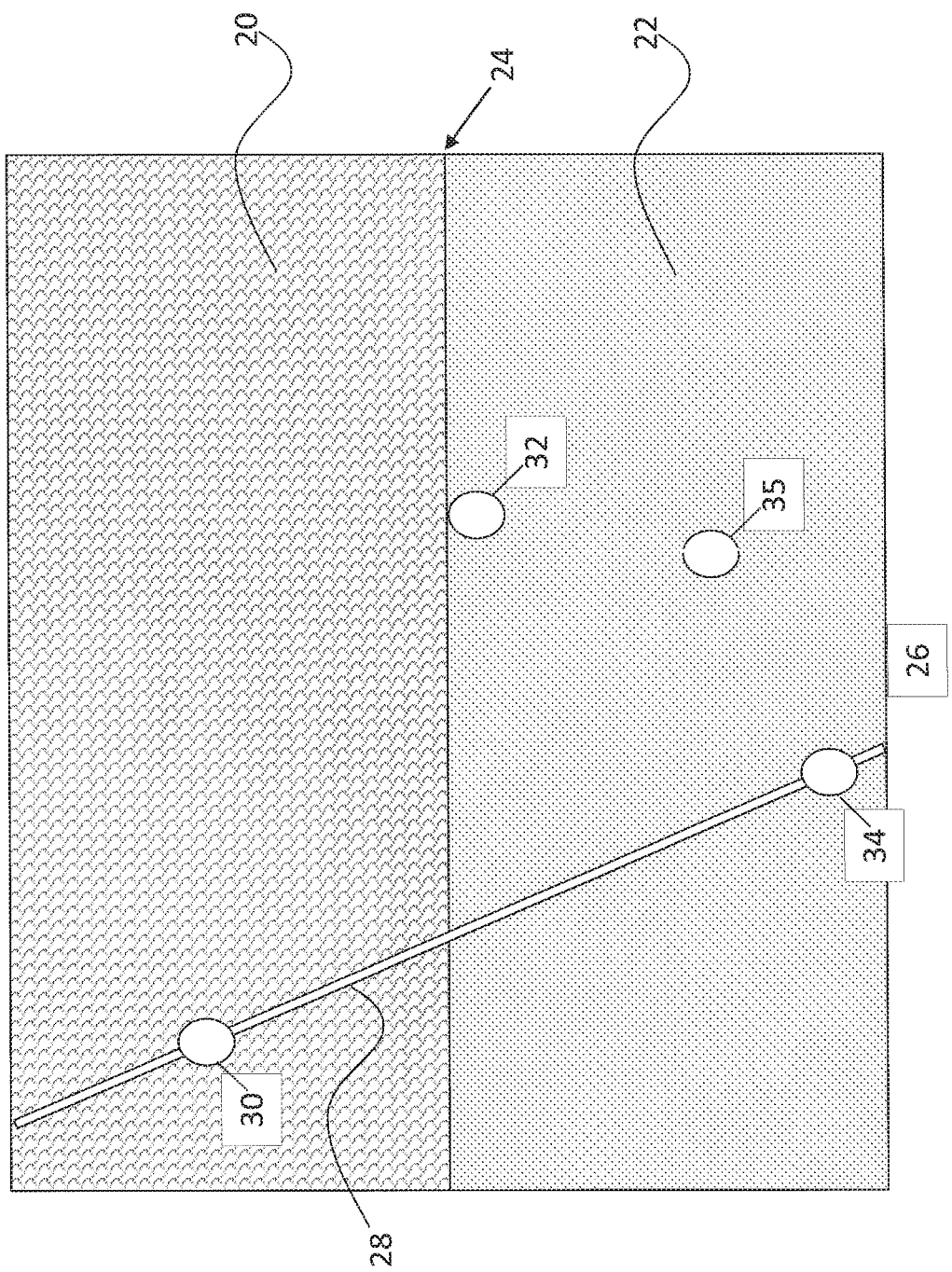
FIG. 2 is a cross-sectional view of a geologic formation in which a tiered or stacked geothermal loop energy production system according to embodiments disclosed herein may be emplaced.

Referring now to FIG. 2, a cross-sectional diagram of a stacked loop system according to embodiments herein is illustrated. The subsurface environment as illustrated includes a section or strata of caprock, zone 20. Caprock zone 20 is, in large part, generally unsuitable for use with closed-loop pipe systems to energize sCO2 or other fluids. For example, caprock 20 may be impermeable, or it may not have a region of hot water upwelling from further below.

Below caprock zone 20 may be a strata including permeable rock, referred to herein as convection zone 22. There is a boundary 24 between caprock zone 20 and convection zone 22, where hot water or other hot fluids may be moved by convection from a deeper hot zone 26 of convection zone 22. There may also be one or more fault lines 28 that may serve as a conduit for geothermal brine to upsurge from the deeper hot zone 26 into the convection zone 22 and/or into the caprock zone 20.

Embodiments disclosed herein target placement of a closed-loop pipe system within specific target areas of the geological formation so as to provide efficient transfer from the geothermal brine to the transfer fluid in the pipe system, such as sCO2. The subsurface target areas may include any of the following positions or combinations thereof:

(A) Within the fault 28, at shallow depths, such as to a target area 30. This position, because of its nearness to the surface, has only moderate temperatures, and must be drilled carefully to make sure that the horizontal pipe run is actually in the fault zone. However, the relatively shallow depth makes drilling easier and less expensive.

(B) Proximate boundary 24 between the caprock zone 20 and convection zone 22, such as to target area 32. This position does not require precision drilling, as the boundary may be fairly large. It also features high water temperatures. On the other hand, the drilling is deeper and may be more expensive.

(C) Within the fault 28, at deeper depths, such as to a target area 34. This position allows access to the hottest formation water, as it is through the fault line that the geothermal brine upsurges into the formation. This advantage is offset by the requirements to drill both deeply and very precisely to intersect the fault 28.

Taken together, these three possible target areas or positions in which to emplace a pipe system, such as a horizontal run of a closed-loop system for the energy production system shown in FIG. 1, allows exploitation of the entire subsurface portion of a property used for geothermal energy production, rather than just the heat at one or even several horizontal levels. Moreover, whereas most geothermal energy processes avoid production near or at fault lines, embodiments herein utilize the unique properties of fault lines to advantage. Fault lines and caprock boundaries provide for natural convection, where a flow of geothermal brine or other subsurface fluids is naturally present in the formation, and embodiments herein utilize this built-in natural convection to advantage, enhancing the effectiveness of energy production systems associated therewith.

Systems for producing geothermal energy according to embodiments disclosed herein may thus include one or more pipe systems disposed within a heat producing geologic formation. For example, systems for producing geothermal energy according to embodiments herein may include one or more of: (A) a first closed-loop pipe system emplaced within a convection zone of a heat-producing geologic formation, such as proximate a boundary between a caprock zone and the convection zone; (B) a second closed-loop pipe system emplaced within a fault within the convection zone; (C) a third closed-loop pipe system emplaced within a fault deep within the convection zone; and/or (D) a fourth closed-loop pipe system emplaced within a fault within a caprock zone, such as within the fault proximate the convection zone. Combinations of two or more of (A)-(D) may allow for full exploitation of a particular geothermal area.

The emplacement of the pipe systems according to embodiments herein is not performed on a chance basis. Rather, emplacement of the pipe systems is performed, at least in part, based on data collected during drilling of a wellbore.

For example, in some embodiments, a wellbore may be drilled into a subsurface geologic formation with a drill bit. While drilling, the properties of the subsurface geologic formations may be measured, such as temperatures, pressures, position of the drill bit and/or measurement device, conductivity or composition of the formation or formation fluids proximate the drill string, permeability of the formation (rock type, etc.), and microseismic data, among other possible measurements that may be taken via sampling of the formation, drilling fluids, or drilled solids, measurement while drilling (MWD) tools, or logging while drilling (LWD) tools.

The measured properties and other data collected during the drilling process may be analyzed, such as in real time or near real time, to identify a target zone. For instance, analyses may indicate a boundary between a caprock zone and a convection zone. Once identified, the trajectory of the drill bit may be adjusted to pass the wellbore into or through the identified target zone, and/or to maintain the path of the wellbore along or proximate the target zone, such as proximate the boundary between the caprock zone and the convection zone. After the wellbore is completed, with at least a portion of the wellbore being into or through the target zone, a closed-loop pipe system may be emplaced within the wellbore to harvest heat from the target zone.

Baseline data regarding a geologic formation may be obtained via one or more methods, such as surface seismic data. This data, however, may only provide a general overview of what can be expected to be encountered during the drilling process, and in large part is traditionally used for the basic "hot zone" targeting noted above. The accuracy of such data and modeling is improving, but the ability to measure and analyze during the drilling process, and adjust a path of the drill bit during the drilling process, to hit a target zone with prominent natural convection, provides significant advantages, as one skilled in the art would surely appreciate.

Additional or alternative data regarding a particular geologic formation or area may also be available, such as from a prior well drilled proximate the area of interest. For example, a wellbore may have been drilled to a deep oil-bearing formation. During drilling the oil wellbore, data collected may have indicated one or more water-bearing formations having sufficient heat for closed-loop sCO2 energy production. This data, alone or in conjunction with other seismic data, may be analyzed to determine a target area for emplacement of a closed-loop pipe system for geothermal energy production.

Further, drilling of a first wellbore to a target zone may provide further information regarding a formation. Analysis of measurements or data collected during drilling of the first wellbore may thus allow for determination of a second target zone. For example, a first wellbore may be drilled to emplace a closed-loop pipe system proximate a boundary between a caprock zone and a convection zone. Analysis of data gathered during the drilling of the first wellbore, such as microseismic data, may indicate the presence of a fault line. A second wellbore may then be drilled to the fault line, the identified second target zone, and a second closed-loop pipe system may be emplaced within the second wellbore to harvest energy from the formation proximate the second target zone.

Although described above with respect to the first target being a boundary, the first target could be a fault line in a caprock zone, a fault line deep within a convection zone, or even a generic "hot spot" type drilling, where the aim is to hit anywhere within the convection zone (such as a target 35 as shown in FIG. 2), gather information, and stack loop systems in the area based on the drilling of the first wellbore so as to advantageously target the natural convection areas of the formation.

Similarly, drilling of the second wellbore to the second target zone may provide further information regarding the geological area. The cumulative data from the various prior operations in the vicinity may provide for an extremely accurate depiction of the formation, and may allow for a very precise model of the formation to be generated. As more is learned, and the model refined, the ability to precisely target natural convection areas of the formation, such as a fault line deep within the convection zone, having very high formation temperatures and good circulation, is improved, reducing the drilling risk and the costs associated with targeting such a formation structure.

The manner of emplacing a tiered or stacked closed-loop pipe system, as described above, may thus depend on the amount of information initially available and that generated throughout the process. Embodiments disclosed herein, nevertheless, target specific natural convection areas of a formation to advantageously harvest energy.

Figure 3:
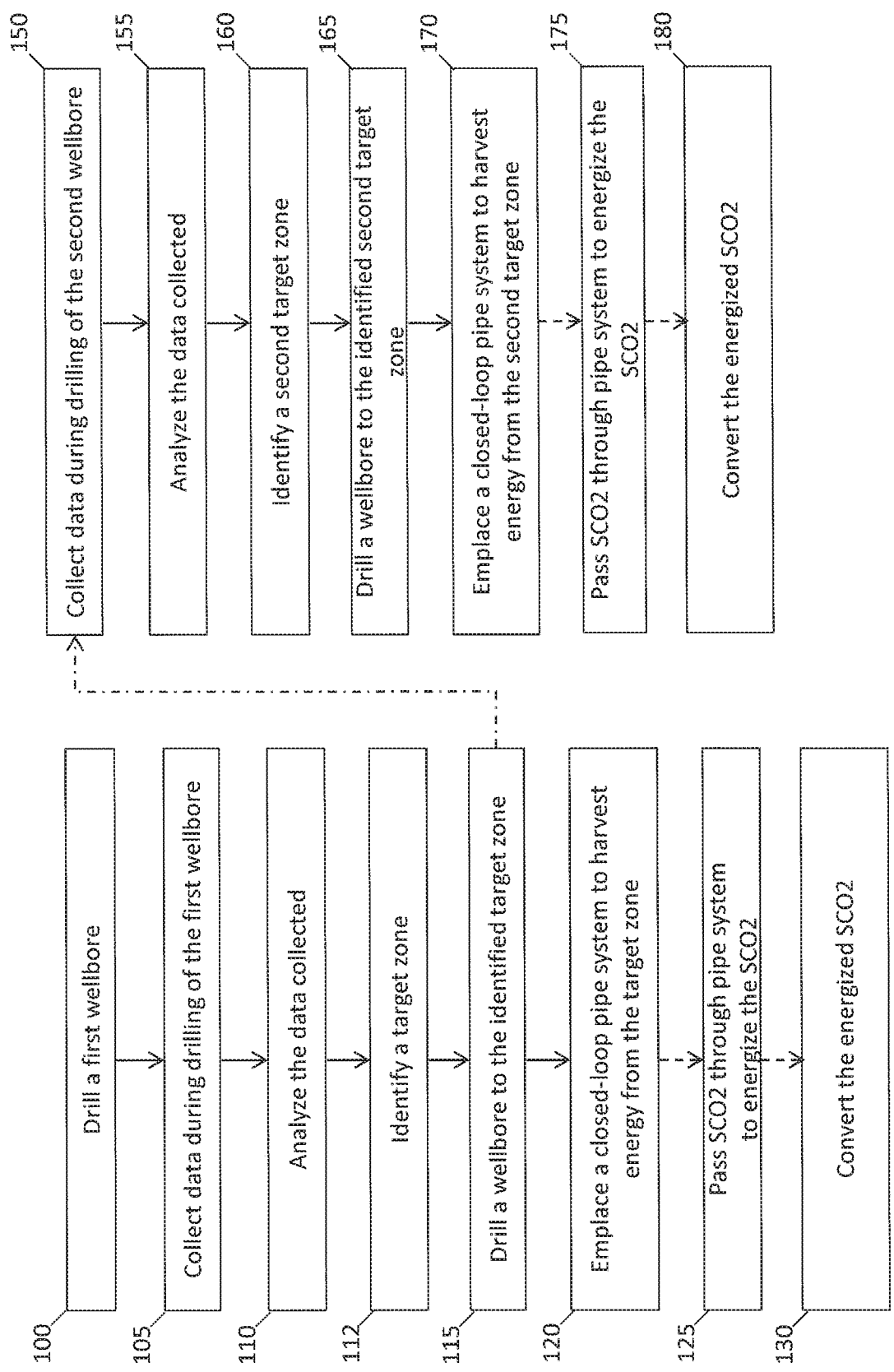
FIG. 3 is a flow diagram illustrating method steps for installing a tiered or stacked geothermal loop energy production system according to embodiments herein.

A method of producing geothermal energy according to embodiments herein may include the steps as illustrated in FIG. 3. The method may include a first step 100 of drilling a first wellbore into a subsurface geologic formation. The first wellbore may be, for example, an oil well, a water well, a first wellbore for emplacement of a closed-loop pipe system for a geothermal energy production system, or an exploratory well.

Step 105 may include collecting data from the subsurface geologic formation while drilling the first wellbore. Collecting data during the drilling of the first wellbore may include one or more of: recording a temperature of the subsurface geologic formation; recording a pressure of the subsurface geologic formation; recording microseismic data during the drilling; recording a position of a drill bit in the wellbore during the drilling, including direction data, borehole inclination, and azimuth during the actual drilling process. Collecting data may also include measuring a property of the subsurface formation using a measurement tool. For example, a measurement tool or MWD tool may be used to measure various properties of a formation, such as one or more of conductivity, composition, hardness, type of rock, density, resistivity, and porosity or permeability, among many others.

In step 110, the collected data is analyzed, and in step 112 a target zone is identified. Analyzing the collected data may include one or more of: determining a location of a boundary between a convection zone and a caprock zone; determining a location of a fault in a caprock zone; determining a location of a fault in a convection zone (advection zone); determining a zone comprising rock with permeability suitable for movement of formation water. The analysis may also include generating a model of the geologic formation, displaying the model of the geologic formation, and analyzing the model to determine a target zone.

As noted above, even within the convection zone, there may be very localized convection paths based on the local permeability of the rocks, which may vary over short distances, both horizontal and vertical. The analysis may be used to determine the zones having rock with a permeability suitable for significant movement of formation water, and may include identifying one or more zones having a permeability of at least 50 Darcy, such as at least 75 Darcy, at least 90 Darcy, or at least 100 Darcy. Areas of sufficient permeability may provide for a good flow of geothermal brine or other formation fluids, providing for a much better energy removal efficiency via the closed-loop pipe system to be emplaced.

In step 115, a second wellbore is drilled to the identified target zone. As discussed above, drilling of the second wellbore may be based on surface seismic data or other data generated prior to drilling the first wellbore, as well as data collected during drilling of the first wellbore. Further, data may be collected and analyzed during drilling of the second wellbore, and a drill bit course correction may be made, if necessary, based on a refined analysis using real-time or near real-time data during the drilling. The refinement of the model and accuracy of the wellbore placement may further enhance the heat transfer efficiency via the closed-loop pipe system to be emplaced, such as by hitting a zone having a higher permeability and convective flow as compared to an initial target.

In step 120, a closed-loop pipe system may be emplaced within the second wellbore to harvest energy from the target zone. Emplacing the closed-loop pipe system may include disposing a horizontal, vertical, and/or angled pipe run that at least partially passes through the identified target zone. In some embodiments, the second wellbore may have a diameter in the range from 2 inches to 24 inches, and the closed-loop pipe system may include one or more pipes having an external diameter smaller than the diameter of the second wellbore. In other embodiments, the second wellbore may have a diameter in the range from 3 inches to 16 inches, such as 4 inches to 14 inches or 6 inches to 12 inches, and the closed-loop pipe system may include one or more pipes having an external diameter at least 2 inches less than the diameter of the second wellbore.

After emplacement of the closed-loop pipe system, a transfer fluid, such as sCO2, may be passed through the closed-loop pipe system to produce an energized stream in step 125. When using sCO2, for example, the energized stream may have both an increased temperature and pressure relative to the sCO2 introduced through the injection well. The energized stream may then be converted to other forms of energy in step 130. Energy conversion processes may include, for example, power production units such as one or more of a turbine, a turbine and generator, a CO2 turbine, a pseudo-turbine, including those that derive electrical or mechanical power from linear or non-linear motion, a heat exchanger in a Rankine cycle power generation system, Brayton cycle turbines, or any other mechanism producing useful work or power from heat. Following conversion of the energy contained in the transfer fluid, the transfer fluid may be forwarded from the power production unit to the injection well to restart the cycle.

In some embodiments, it may be desired to drill to one or more additional target zones to result in the desired tiered or stacked loop system. In such instances, steps 120, 125 and 130 may be done prior to, during, or subsequent to drilling to the additional target zones.

Where it is desired to drill to one or more additional target zones, the targeting and drilling precision for the additional loops to be emplaced may be enhanced by steps 150, 155, and 160, collecting data from the subsurface geologic formation while drilling the second wellbore, analyzing the data collected while drilling the second wellbore, and identifying a second target zone, respectively. Once identified, a third wellbore may be drilled to the identified second target zone in step 165, which may be enhanced by real-time or near real-time analyses as described above with respect to the second wellbore. A second closed-loop pipe system may subsequently be emplaced within the third wellbore in step 170 to facilitate harvesting energy from the second target zone. Once emplaced, SCO2 or another transfer fluid may then be passed through the second closed-loop pipe system and the energized SCO2 or transfer fluid may be converted via one or more energy conversion processes, in steps 175 and 180, respectively.

As noted above, the first wellbore may also be, in some embodiments, used for emplacement of a closed-loop pipe system for a geothermal energy production system. This wellbore may be an exploratory well, generally directed to a "hot zone." In other embodiments, data for the geologic formation may be analyzed prior to drilling of the first wellbore, such as to identify a location of a boundary between a convection zone and a caprock zone. The first wellbore may be drilled such that the first wellbore is disposed proximate the identified boundary location between the convection zone and the caprock zone, during which additional data regarding the formation is obtained and used, as described above. A closed-loop pipe system may also be disposed within the first wellbore for harvesting energy from the formation.

Figure 4:
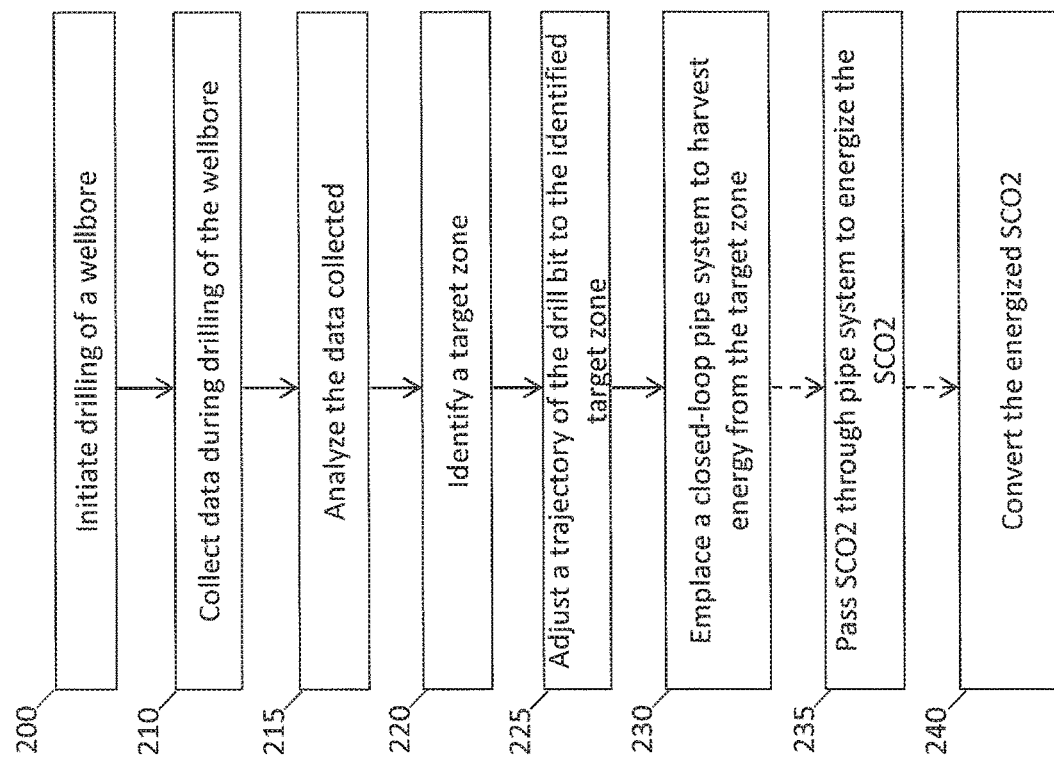
FIG. 4 is a flow diagram illustrating method steps for installing a tiered or stacked geothermal loop energy production system according to embodiments herein.

As noted above, it may be desirable to adjust the target zone based on model refinements achievable via data collection during a drilling process. Methods of producing geothermal energy may also include the steps as illustrated in FIG. 4. Step 200 may include drilling a wellbore into a subsurface geologic formation with a drill bit. During the drilling process, step 210 may include measuring properties of the subsurface geologic formation while drilling the wellbore. The measured properties of the subsurface geologic formation may then be analyzed in step 215, and to identify a target zone in step 220.

Based on the analyses and identifying, step 225 may include adjusting a trajectory of the drill bit to pass the resulting wellbore into or through the identified target zone. Subsequently, a closed-loop pipe system may be emplaced, in step 230, within the wellbore to harvest energy from the target zone. sCO2 may then be passed through the pipe system in step 235 to result in an energized sCO2 stream, which may then be converted in step 240, such as being used to generate electricity or in other conversion processes noted above.

The tiered or stacked loop system resulting from the method outlined in FIG. 4 may also include additional closed-loop pipe systems. As described above, the measured properties of the subsurface geologic formation gathered during drilling of the wellbore may be analyzed to identify a second target zone. A second wellbore may then be drilled to the identified second target zone, and a second closed-loop pipe system emplaced within the second wellbore to harvest energy from the second target zone. Methods for producing geothermal energy according to embodiments herein may thus include analyzing measurement while drilling (MWD) data or logging while drilling (LWD) data of a geologic formation to identify a convective geothermal target zone; drilling a wellbore to the identified convective geothermal target zone; and emplacing a closed-loop pipe system within the wellbore to harvest energy from the convective geothermal target zone.

Figure 5:
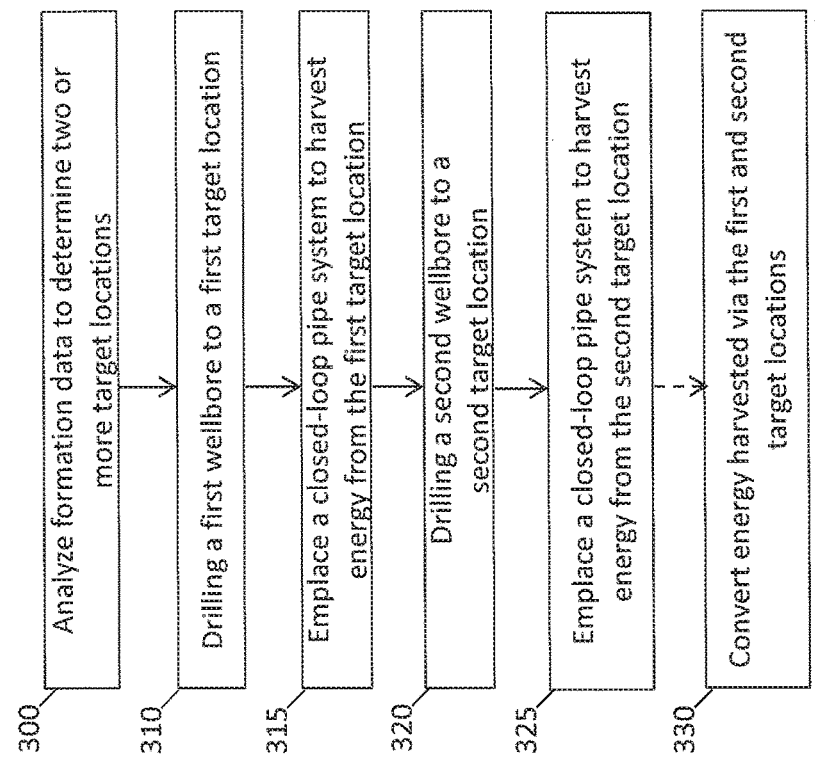
FIG. 5 is a flow diagram illustrating method steps for installing a tiered or stacked geothermal loop energy production system according to embodiments herein.

In yet further embodiments, methods of producing geothermal energy may include the steps as illustrated in FIG. 5. As outlined in FIG. 5, the method may include a step 300 of analyzing formation data to determine two or more target locations having different convective heat flow characteristics. After the first target location is identified, a first wellbore may be drilled to the first target location in step 310. A first closed-loop pipe system may subsequently be disposed within the first wellbore to harvest energy from the formation in step 315. After the second target location is identified, a second wellbore may be drilled to the second target location in step 320. A second closed-loop pipe system may subsequently be disposed within the second wellbore, in step 325, to harvest energy from the formation. The method may further include a step 330, converting energy harvested via the first and second closed-loop pipe systems.

As described above, systems for producing geothermal energy according to embodiments herein are configured to utilize varying heats from the different formations, thus providing for stacking or tiered energy systems. For example, a tiered or stacked loop system according to embodiments disclosed herein may include a first closed-loop pipe system to a moderate temperature, shallow depth fault zone target 30 (FIG. 2), a second closed-loop pipe system to a high temperature, moderate depth boundary zone target 32, and a third closed-loop pipe system to a very high temperature, relatively deep fault zone target 34. Methods of producing geothermal energy according to embodiments herein may also include disposing two or more closed-loop pipe systems within a geologic formation at targeted locations having different convective heat flow characteristics. Energy from the geologic formation may then be harvested via the two or more closed-loop pipe systems, and the harvested energy may be converted, such as to electricity, via a conversion system.

The energy conversion systems located at the surface, for converting energy harvested by the circulating transfer fluid, such as sCO2, may also be configured to efficiently utilize the harvested energy. In some embodiments, a tiered or stacked loop energy production system including three loops may include three separate trains for converting the harvested energy to electricity, where the sCO2 turbines and associated generators are sized relative to the energy production expected from the respective target zones. In other embodiments, the energized sCO2 streams may be combined to form a combined energized stream that feeds a common energy conversion system. In this manner, a very high temperature loop may compensate, and allow for, lower temperature loops, increasing the effectiveness of energy harvest from the field and increasing the overall system efficiency.

Alternatively, the conversion system may be configured to utilize the two or more closed-loop pipe systems in a tiered manner. The geothermal loop energy production system may include a single energy conversion system utilizing the stacked loops in a progressive fashion, such as in order from lowest energy production to highest energy production, based on the expected harvest from each of the respective target zones. In some embodiments, the tiered or stacked loop system may be associated with an energy conversion system that may include two or more different types of energy conversion systems, allowing overall energy conversion efficiency to be optimized. For example, where the system includes a very high temperature loop, and one or more moderate and/or high temperature loops, the energy conversion systems may be matched to the energy of the sCO2 stream, and in this example may include one or more CO2 turbines, which have excellent efficiencies at higher temperatures, and may also include one or more loops feeding to an organic Rankine cycle (ORC) system.

As described above, embodiments disclosed herein provide for tiered or stacked geothermal loop energy production systems. The systems advantageously emplace closed-loop pipe systems at target locations within a formation that naturally provide for convection or advection, thus enhancing the indirect heat transfer from the formation fluids to a transfer fluid passing through the closed-loop pipe system. By targeting natural convection and advection zones, not only are energy transfer capabilities enhanced, but the enhancement may be achieved with a reduced need, or may completely eliminate the need for stimulation processes to improve heat transfer. Embodiments disclosed herein further advantageously utilize MWD or LWD data to refine and enhance models of the formation to accurately target portions of the geologic area that may provide enhanced energy transfer, where such targeting may be performed in advance of drilling as well as during the drilling process itself. Overall, embodiments herein may provide for improved usage of formation energy, with the added side benefit of reduced need for expensive stimulation processes.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method of producing geothermal energy, comprising:
disposing two or more closed-loop pipe systems within a geologic formation at targeted locations having different heat flow characteristics to form a tiered or stacked loop energy system, wherein each of the two or more closed-loop pipe systems comprises an injection well, a production well spaced a distance from the injection well, and a horizontal well fluidly coupling the injection well to the production well,
wherein the disposing of at least one of the two or more closed-loop pipe systems comprises targeting un-stimulated convection areas of the geologic formation, and wherein the method does not comprise stimulating the formation;
harvesting energy from the geologic formation via the two or more closed-loop pipe systems;
converting the harvested energy via a conversion system configured to utilize the two or more closed-loop pipe systems.

2. The method of claim 1, wherein the two or more closed-loop pipe systems include a first temperature loop and a second temperature loop, wherein the first temperature loop has a temperature higher than the second temperature loop, and wherein the conversion system comprises a CO2 turbine associated with the first temperature loop and a Rankine cycle system associated with the second temperature loop.

3. The method of claim 1, wherein the disposing comprises:
emplacing a first closed-loop pipe system of the two or more closed-loop pipe systems within a convection zone of a heat-producing geologic formation; and
emplacing a second closed-loop pipe system of the two or more closed-loop pipe systems within a fault within the convection zone or within a fault within a caprock zone proximate the convection zone of the heat-producing geologic formation.

4. The method of claim 3, wherein the disposing further comprises:
emplacing a third closed-loop pipe system and/or a fourth closed-loop pipe system of the two or more closed-loop pipe systems within a convection zone of the geologic formation.

5. The method of claim 4, wherein the third closed-loop pipe system is emplaced within a second fault within the convection zone, wherein the second fault is at a depth deeper than the fault within the convection zone or the fault within a caprock zone.

6. The method of claim 1, wherein the targeted un-stimulated convection areas of the geologic formation comprise a zone having a permeability of at least 100 Darcy.

7. The method of claim 1, wherein the disposing comprises targeting locations for the closed-loop pipe systems based on data collected during drilling of a wellbore, based on data collected during drilling of a wellbore for the first closed-loop pipe system, or a combination thereof.

8. The method of claim 7, wherein the data collected comprises microseismic data.

9. The method of claim 1, wherein the conversion system comprises a single energy conversion system, and wherein the converting the harvested energy using the single energy conversion system comprises utilizing energy from the two or more closed-loop pipe systems in order from lowest energy production to highest energy production.

10. A system for producing geothermal energy, comprising:
   a tiered geothermal loop energy production system, comprising;
      a first closed-loop pipe system emplaced within a heat-producing geologic formation, the first closed-loop pipe system having a first energy production; and
      a second closed-loop pipe system emplaced within the heat producing geologic formation, the second closed-loop pipe system having a second energy production greater than the first energy production; and,
      optionally a third closed-loop pipe system emplaced within the heat producing geologic formation, the third closed-loop pipe system having a third energy production,
   wherein the first closed-loop pipe system, the second closed-loop pipe system, and the optional third closed-loop pipe system each comprise an injection well, a production well spaced a distance from the injection well, and a horizontal well fluidly coupling the injection well to the production well, and
   wherein one of the first closed-loop pipe system, the second closed-loop pipe system, or the optional third closed-loop pipe system are emplaced within an un-stimulated convection area of the geologic formation; and
   an energy conversion system configured to convert energy from the tiered geothermal loop energy production system to another form of energy.

11. The system of claim 10, wherein the energy conversion system comprises a $CO_2$ turbine associated with the highest energy production loop and a Rankine cycle system associated with the energy production loop producing lower energy than the highest energy production loop.

12. The system of claim 10, wherein the energy conversion system comprises a single energy conversion system configured to utilize energy from the two or more closed-loop pipe systems in order from lowest energy production to highest energy production.

13. The system of claim 10, further comprising a flow line for combining a first energized stream and a second energized stream, produced by each of the two or more closed-loop pipe systems, respectively, to form a combined energized stream and for providing the combined energized stream to a common energy conversion system.

* * * * *